(12) United States Patent  
Faber et al.

(10) Patent No.: US 7,886,009 B2  
(45) Date of Patent: Feb. 8, 2011

(54) GATE KEEPER

(75) Inventors: Scott Faber, San Francisco, CA (US);
Sean David Van der Linden, San Francisco, CA (US); Henrik Axel Ebbe Altberg, Mill Valley, CA (US); James Migdal, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 944 days.

(21) Appl. No.: 10/923,396

(22) Filed: Aug. 20, 2004

(65) Prior Publication Data

US 2005/0071509 A1  Mar. 31, 2005

Related U.S. Application Data

(60) Provisional application No. 60/497,273, filed on Aug. 22, 2003.

(51) Int. Cl.
*G06F 15/16* (2006.01)

(52) U.S. Cl. ............. 709/206; 709/225; 709/228; 709/229; 705/9; 379/210.02

(58) Field of Classification Search ......... 709/204–207, 709/223, 225, 227–229; 379/210.02; 705/9
See application file for complete search history.

(56) References Cited

U.S. PATENT DOCUMENTS

| | | | |
|---|---|---|---|
| 4,741,025 A | 4/1988 | Maruyama et al. |
| 4,796,293 A | 1/1989 | Blinken et al. |
| 4,969,185 A | 11/1990 | Dorst et al. |
| 5,099,510 A | 3/1992 | Blinken, Jr. et al. |
| 5,206,903 A | 4/1993 | Kohler et al. |
| 5,369,694 A | 11/1994 | Bales et al. |
| 5,373,549 A | 12/1994 | Bales et al. |
| 5,436,957 A | 7/1995 | McConnell |
| 5,448,625 A | 9/1995 | Lederman |
| 5,453,352 A | 9/1995 | Tachibana |
| 5,459,779 A | 10/1995 | Backaus et al. |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,533,107 A | 7/1996 | Irwin et al. |

(Continued)

FOREIGN PATENT DOCUMENTS

AU           699785           5/1995

(Continued)

OTHER PUBLICATIONS

U.S. Appl. No. 09/596,466, filed Jun. 19, 2000, Agdeppa, Hector A.

(Continued)

*Primary Examiner*—Oanh Duong
(74) *Attorney, Agent, or Firm*—Greenberg Traurig, LLP

(57) ABSTRACT

According to one embodiment of the present invention, a method of gate keeping contact between a plurality of users is disclosed. The method includes: providing a central network to establish communication between the plurality of users; and each of the plurality of users having access to a facility to approve or disapprove of any of the plurality of users to permit communication between respective users.

24 Claims, 5 Drawing Sheets

U.S. PATENT DOCUMENTS

| | | |
|---|---|---|
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,644,715 A | 7/1997 | Baugher |
| 5,675,734 A | 10/1997 | Hair |
| 5,689,553 A | 11/1997 | Ahuja et al. |
| 5,694,537 A | 12/1997 | Montenegro et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,841,763 A | 11/1998 | Leondires et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,903,877 A | 5/1999 | Berkowitz et al. |
| 5,907,677 A | 5/1999 | Glenn et al. |
| 5,911,132 A | 6/1999 | Sloane |
| 5,914,951 A | 6/1999 | Bentley et al. |
| 5,915,214 A | 6/1999 | Reece et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,943,422 A | 8/1999 | Van Wie et al. |
| 5,946,646 A | 8/1999 | Schena et al. |
| 5,948,054 A | 9/1999 | Nielsen |
| 5,960,406 A | 9/1999 | Rasansky et al. |
| 5,960,416 A | 9/1999 | Block |
| 5,970,466 A | 10/1999 | Detjen et al. |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,439 A | 1/2000 | Walker et al. |
| 6,014,644 A | 1/2000 | Erickson |
| 6,016,478 A | 1/2000 | Zhang et al. |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,035,278 A | 3/2000 | Mansour |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,067,561 A | 5/2000 | Dillon |
| 6,072,493 A | 6/2000 | Driskell et al. |
| 6,076,093 A | 6/2000 | Pickering |
| 6,078,866 A | 6/2000 | Buck et al. |
| 6,085,084 A * | 7/2000 | Christmas .................. 455/411 |
| 6,130,933 A | 10/2000 | Miloslavsky |
| 6,131,085 A | 10/2000 | Rossides |
| 6,144,670 A | 11/2000 | Sponaugle et al. |
| 6,167,379 A | 12/2000 | Dean et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,185,289 B1 | 2/2001 | Hetz et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,212,268 B1 | 4/2001 | Nielsen |
| 6,216,111 B1 | 4/2001 | Walker et al. |
| 6,223,165 B1 | 4/2001 | Lauffer |
| 6,230,287 B1 | 5/2001 | Pinard et al. |
| 6,233,566 B1 | 5/2001 | Levine et al. |
| 6,243,684 B1 | 6/2001 | Stuart et al. |
| 6,259,774 B1 | 7/2001 | Miloslavsky |
| 6,266,651 B1 | 7/2001 | Wooston |
| 6,269,336 B1 | 7/2001 | Ladd et al. |
| 6,269,361 B1 | 7/2001 | Davis et al. |
| 6,292,799 B1 | 9/2001 | Peek et al. |

| | | |
|---|---|---|
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |
| 6,310,941 B1 | 10/2001 | Crutcher et al. |
| 6,311,231 B1 | 10/2001 | Bateman et al. |
| 6,314,402 B1 | 11/2001 | Monaco et al. |
| 6,314,454 B1 | 11/2001 | Wang et al. |
| 6,385,583 B1 | 5/2002 | Ladd et al. |
| 6,389,278 B1 | 5/2002 | Singh |
| 6,389,541 B1 | 5/2002 | Patterson |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,424,952 B1 | 7/2002 | Yinbal |
| 6,430,276 B1 | 8/2002 | Bouvier et al. |
| 6,434,527 B1 | 8/2002 | Horvitz |
| 6,463,136 B1 | 10/2002 | Malik |
| 6,470,079 B1 | 10/2002 | Benson |
| 6,470,317 B1 | 10/2002 | Ladd et al. |
| 6,470,338 B1 | 10/2002 | Rizzo et al. |
| 6,477,246 B1 | 11/2002 | Dolan et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,519,570 B1 | 2/2003 | Faber et al. |
| 6,523,010 B2 | 2/2003 | Lauffer |
| 6,529,878 B2 | 3/2003 | De Rafael et al. |
| 6,535,506 B1 | 3/2003 | Narain et al. |
| 6,539,359 B1 | 3/2003 | Ladd et al. |
| 6,542,732 B1 | 4/2003 | Khazaka et al. |
| 6,546,372 B2 | 4/2003 | Lauffer |
| 6,549,889 B2 | 4/2003 | Lauffer |
| 6,560,576 B1 | 5/2003 | Cohen et al. |
| 6,563,915 B1 | 5/2003 | Salimando |
| 6,606,376 B1 | 8/2003 | Trell |
| 6,609,106 B1 | 8/2003 | Robertson |
| 6,611,501 B1 | 8/2003 | Owen et al. |
| 6,625,595 B1 | 9/2003 | Anderson et al. |
| 6,636,590 B1 | 10/2003 | Jacob et al. |
| 6,658,389 B1 | 12/2003 | Alpdemir |
| 6,668,286 B2 | 12/2003 | Bateman et al. |
| 6,731,625 B1 | 5/2004 | Eastep et al. |
| 6,741,691 B1 | 5/2004 | Ritter et al. |
| 6,757,364 B2 | 6/2004 | Newkirk |
| 6,771,760 B1 | 8/2004 | Vortman et al. |
| 6,775,359 B1 | 8/2004 | Ron et al. |
| 6,798,753 B1 | 9/2004 | Doganata et al. |
| 6,801,899 B2 | 10/2004 | Lauffer |
| 6,832,321 B1* | 12/2004 | Barrett ................ 726/11 |
| 6,836,225 B2 | 12/2004 | Lee et al. |
| 6,898,435 B2 | 5/2005 | Milman |
| 6,910,159 B2* | 6/2005 | Phillips et al. ............. 714/38 |
| 6,917,610 B1 | 7/2005 | Kung et al. |
| 6,968,174 B1 | 11/2005 | Trandal et al. |
| 6,990,183 B2* | 1/2006 | Holland et al. ............. 379/157 |
| 7,031,697 B2* | 4/2006 | Yang et al. ............. 455/414.1 |
| 7,224,781 B2 | 5/2007 | Jacob et al. |
| 7,359,498 B2 | 4/2008 | Faber et al. |
| 7,383,303 B1 | 6/2008 | Bort |
| 7,388,950 B2 | 6/2008 | Elsey et al. |
| 7,412,049 B1* | 8/2008 | Koch ................ 379/210.02 |
| 2001/0012357 A1 | 8/2001 | Mirashrafi et al. |
| 2001/0018178 A1* | 8/2001 | Siefert ................ 434/322 |
| 2001/0025274 A1 | 9/2001 | Zehr et al. |
| 2001/0027481 A1 | 10/2001 | Whyel |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0044751 A1 | 11/2001 | Pugliese et al. |
| 2001/0048737 A1 | 12/2001 | Goldberg et al. |
| 2002/0003867 A1 | 1/2002 | Rothschild et al. |
| 2002/0010608 A1* | 1/2002 | Faber et al. ................ 705/8 |
| 2002/0010616 A1* | 1/2002 | Itzhaki ................ 705/9 |
| 2002/0024948 A1 | 2/2002 | Pendse |
| 2002/0029241 A1 | 3/2002 | Yokono et al. |
| 2002/0038233 A1 | 3/2002 | Shubov et al. |
| 2002/0038293 A1 | 3/2002 | Seiden |
| 2002/0042826 A1 | 4/2002 | Gaus et al. |
| 2002/0059082 A1 | 5/2002 | Moczygemba |
| 2002/0065959 A1 | 5/2002 | Kim et al. |
| 2002/0071423 A1 | 6/2002 | Mirashrafi et al. |
| 2002/0071426 A1 | 6/2002 | Karamchedu et al. |
| 2002/0072974 A1 | 6/2002 | Pugliese et al. |
| 2002/0073207 A1 | 6/2002 | Widger et al. |
| 2002/0087565 A1 | 7/2002 | Hoekman et al. |
| 2002/0091607 A1 | 7/2002 | Sloan et al. |
| 2002/0095331 A1 | 7/2002 | Osmar et al. |
| 2002/0095359 A1 | 7/2002 | Mangetsu |
| 2002/0107697 A1 | 8/2002 | Jensen |
| 2002/0120554 A1 | 8/2002 | Vega |
| 2002/0128891 A1 | 9/2002 | McSherry |
| 2002/0133571 A1 | 9/2002 | Jacob et al. |
| 2002/0137490 A1* | 9/2002 | Gallant ................ 455/411 |
| 2002/0164001 A1* | 11/2002 | Holland et al. ............. 379/88.22 |
| 2002/0169836 A1 | 11/2002 | Hood et al. |
| 2002/0191762 A1 | 12/2002 | Benson |
| 2002/0193094 A1 | 12/2002 | Lawless et al. |
| 2002/0193135 A1 | 12/2002 | Nakano |
| 2003/0005126 A1 | 1/2003 | Schwartz et al. |
| 2003/0014295 A1 | 1/2003 | Brookes et al. |
| 2003/0041255 A1* | 2/2003 | Chen et al. ................ 713/193 |
| 2003/0043981 A1 | 3/2003 | Lurie et al. |
| 2003/0046161 A1 | 3/2003 | Kamanger et al. |
| 2003/0061094 A1 | 3/2003 | Banerjee et al. |
| 2003/0112944 A1 | 6/2003 | Brown et al. |
| 2003/0115089 A1* | 6/2003 | Lurie ................ 705/8 |
| 2003/0126205 A1 | 7/2003 | Lurie |
| 2003/0140084 A1* | 7/2003 | D'Angelo ................ 709/106 |
| 2003/0159088 A1* | 8/2003 | Phillips et al. ............. 714/38 |
| 2003/0195838 A1 | 10/2003 | Henley |
| 2003/0220866 A1 | 11/2003 | Pisaris-Henderson |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0038673 A1* | 2/2004 | Dunn et al. ................ 455/417 |
| 2004/0054741 A1* | 3/2004 | Weatherby et al. ............. 709/206 |
| 2004/0066927 A1 | 4/2004 | Horvath et al. |
| 2004/0083133 A1 | 4/2004 | Nicholas et al. |
| 2004/0096110 A1 | 5/2004 | Yogeshwar et al. |
| 2004/0100497 A1* | 5/2004 | Quillen et al. ............. 345/751 |
| 2004/0162757 A1 | 8/2004 | Pisaris-Henderson |
| 2004/0204997 A1 | 10/2004 | Blaser et al. |
| 2004/0208304 A1* | 10/2004 | Miller ................ 379/210.02 |
| 2004/0234049 A1 | 11/2004 | Melideo |
| 2004/0234064 A1 | 11/2004 | Melideo |
| 2004/0236441 A1 | 11/2004 | Melideo |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0020252 A1* | 1/2005 | Yang et al. ................ 455/415 |
| 2005/0021744 A1 | 1/2005 | Haitsuka et al. |
| 2005/0048961 A1 | 3/2005 | Ribaudo et al. |
| 2005/0065811 A1 | 3/2005 | Chu |
| 2005/0080878 A1 | 4/2005 | Cunningham et al. |
| 2005/0086104 A1 | 4/2005 | McFadden |
| 2005/0119957 A1* | 6/2005 | Faber et al. ................ 705/35 |
| 2005/0165666 A1 | 7/2005 | Wong et al. |
| 2005/0203799 A1 | 9/2005 | Faber et al. |

| | | | |
|---|---|---|---|
| 2005/0209874 | A1 | 9/2005 | Rossini |
| 2005/0216341 | A1 | 9/2005 | Altberg et al. |
| 2005/0216345 | A1 | 9/2005 | Altberg et al. |
| 2005/0220289 | A1 | 10/2005 | Reding |
| 2005/0222908 | A1 | 10/2005 | Altberg et al. |
| 2005/0251445 | A1 | 11/2005 | Wong et al. |
| 2006/0031516 | A1 | 2/2006 | Kumer |
| 2006/0075104 | A1 | 4/2006 | Kumer |
| 2006/0095343 | A1 | 5/2006 | Clark et al. |
| 2008/0212756 | A1 | 9/2008 | Faber et al. |
| 2009/0063246 | A1 | 3/2009 | Lurie et al. |

FOREIGN PATENT DOCUMENTS

| | | |
|---|---|---|
| EP | 04253389.3 | 9/2004 |
| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | WO 00/73960 | 12/2000 |
| WO | WO 01/01217 | 1/2001 |
| WO | WO 01/28141 | 4/2001 |
| WO | WO 01/44973 | 6/2001 |
| WO | WO 02/44870 | 6/2002 |
| WO | PCT/US01/51181 | 3/2003 |

OTHER PUBLICATIONS

U.S. Appl. No. 60/198,642, filed Apr. 20, 2000, Rothschild et al.

Abhaya Asthana and Paul Krzyzanowski, "A Small Domain Communications System for Personalized Shopping Assistance," Proceedings of ICPWC'94, Publication No. 0-7803-1996-6/94,IEEE, 1994, pp. 199-203.

Amir Herzberg, et al., "MiniPay: Charging Per Click on the Web," Computer Networks and ISDN Systems 29, (Sep. 1997) vol. 29, pp. 939-951.

Answers.com Web Page (www.answers.com).

"Applying Technology News," Accounting Technology, p. 14 (Feb./Mar. 1997).

Aspect Telecomm: Aspect Integrates the Web into the Call Center. M2 Presswire, Aug. 1996.

Barbara Jarvie, "Company Devoted to Hot-Line Support", Computer Reseller News. Oct. 21, 1991, p. 48.

Big Green Blog: Jan. 2005 Archives, Feb. 21, 2006.

Caring for Customers: Real-Time text chat and telephony provide personalized customer support and turn queries into sales leads, Internet World Media, Sep. 1999.

Chris Ott, "Making Good on the Information Economy". Denver Business Journal, Dec. 17, 1999, p. 27.

Christina Wood, "Hidden Cost of Tech Support", PC World, May 1995, pp. 143-152 & p. 156.

Collett, Stacey & Julie King, "Why Online Browsers Don't Become Buyers," Computerworld, vol. 33, No. 48, p. 14 (Nov. 1999).

"Connecting to On-Line Car Shoppers: Auto Sellers Use Netcall Internet Call-Button Technology to Turn Clicks into Interactive Sales", Business Wire, p. 4089., Jul. 1999.

Cynthia Hodgson, "Online Expert Databases & Services", Econtent, Dec. 1999, p. 48-53.

Davey, Tom, "Wheeling and Dealing Online", PC Week, vol. 13, No. 45, pp. 1, 129., Nov. 1996.

E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.

Edith Herman, "US Courts To Launch First Federal 900 Service," Federal Computer Week, Sep. 28, 1992, p. 8.

Ellen Greenblatt, "Have you ever wondered . . . ", Datamation, Oct. 1997, p. 12.

EXP.com Web Site at www.exp.com/.

"Expertcity.com Launches Premier Online Marketplace for Expert Services," PR Newswire (Aug. 1999).

For Telesphere's Clients, Dial '1-900-TUF LUCK', Business Week, Sep. 9, 1991, 88.

Franco Mercalli, et al., "TheESSAI Teleshopping System: An Example of Broadband Multimedia Application," Publication No. 0-7803-1820-X/94, IEEE, pp. 572-576 (1994).

Gregory Dalton, "Rent-An-Expert On the Web," Information Week p. 75 (Sep. 6, 1999).

Healey, Jon, "From A to Z, You Can Sell Advice Online" Retrieved from http://www.mercurycenter.com on Oct. 24, 2000, published on Nov. 7, 1999.

Infomarkets.com Web Site (www.infomarkets.com).

Information about Expertcity.com retrieved from the Internet [http://www.expertcity.com] on Nov. 6, 2000.

Information about Expertcity.com retrieved from the Internet [URL:http://www.expertcity.com] on Apr. 9, 2000.

Information, Bid and Asked, Forbes, Aug. 20, 1990, 92.

Ingenio Press Archives for 2004, www.ingenio.com, Feb. 21, 2006.

Intellect Exchange Web Site (www.intellectexchange.com).

"Introducing 1-800-FREE411: First Nationwide Free Telephone Directory Assistance Service" Jingle Networks, Inc., Huntington Beach, Calif., Sep. 20, 2005.

ISDN Tutorial: Definitions, http://www.ralphb.net/ISDN/defs.html (Apr. 21. 2000).

ISDN Tutorial:Interfaces, http://www.ralphb.net/ISDN/ifaces.html, printed on Apr. 21, 2000.

J. Sairamesh, et al., "NetBazaar: Networked Electronic Markets For Trading Computation and Information Services", Research and Advanced Technology for Digital Libraries, Second European Conference. ECDL 1998, pp. 839-856 (Sep. 21-23. 1998).

J.W.R. Griffiths, et al., "Multimedia Communication In A Medical Environment", IEEE 1991 Singapore I.C. on Networks, p. 166 (8 pgs.).

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners, Others", Agoura Hills, Calif., Oct. 17, 2005.

Jeff Peline, "Net Firm to Connect Users by Phone," CNET News.com [retrieved from http://new.cnet.com] (Oct. 2001) published Nov. 8, 1999.

Joann M. Wasik, "Information for Sale: Commercial Digital Reference and AskA Service", Virtual Reference Desk, Sep. 20. 1999, at www.vrd.org/AskA/commAskA.html.

John Robinson, "Attachmate Ready to Answer Net Questions", Network World, Apr. 8, 1996, p. 37.

Joseph Menn, "An Expert? There's Now a Home for You on the Internet", Los Angeles Times (retrieved from http://denverpost.com on Oct. 24, 2001).

Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.

Keen.com, Inc. v. InfoRocket.com, Inc., Preliminary Injunction Hearing, pp. 286-289 (Jan. 8, 2002).

Keen.com Feb. 4, 2006.

Keen.com Plans Web Service Allowing Customers to Hold Private Phone Chats, Don Clark, Wall Street Journal, Nov. 8, 1999.

"Keen.com™ Launches First Live Answer Community™, Connects People with Information to Share Over Their Standard Telephone", Press Release [retrieved from http://keen.com] (Oct. 24, 2000), published Nov. 8, 1999.

Keen.com raises $60 Million from Prestigious . . . , Business Wire, Jan. 11, 2000.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.

Linda Littleton, "Meet the Shadowy Future," Proceedings of ACM SIGUCCS User Services Conference XXII Ypsilanti, Michigan Oct. 16-19, 1994, pp. 205-210.

"Lucent Technology and Netscape Team to Deliver Lucent Ecommerce Solutions," Business Wire, Sep. 1998.

Masahiko Hase, Shuji Kawakubo and Mineo Shoman, "Advanced Videophone System Using Synchronized Video Filing Equipment," NTT Review, vol. 3, No. 4 Jul. 1991, pp. 29-36.

Michael Kanellos, "Do You Want to Know The Meaning of Life?", Computer Reseller News. Mar. 3, 1997. pp. 72-74.

Michael Rogers et al, "Experts Abound at New Web Sites", Library Journal, Mar. 1, 2000, pp. 22-24.

"Netcall Internet Call Buttons Enhance E-Commerce Customer Service and Sales", PR Newswire, p. 7431., Aug. 1999.

PCT Search Report for PCT Application No. PCT/US01/48284, filed Oct. 30, 2001 (corresponding to U.S. Appl. No. 09/702,217) mailed May 13, 2002 (7 pgs.).

Qcircuit Web Site (www.qcircuit.com).

Richard A Kuehn, "The Voice of Technology," Credit World, pp. 20-23 (Jul. 1994).

Sell and buy advice online, The Ottawa Citizen, Nov. 29, 1999.

"Surfbrains.com: Brains online save time & money", M2 Presswire, Jul. 11, 2000.

Tehrani, Rich, "e-Rip Van Winkle and the 60 Second Nap," Call Center Solution, vol. 18, No. 2, pp. 16(3)., Aug. 1999.

Telecommunications Buyers Guide and Directory, Editor & Publisher, pp. 29TC-38TC, Feb. 1994.

The Web Site at www.experts-exchange.com/.

The web-site at www.allexperts.com.

"TriNet's, Help Me, I'm Stuck, Internet Voice Button Services Pushes Web Pages to Online Users." Business Wire, Mar. 1998.

"UpSnap Selects LookSmart to Sell Premium Listings on FREE 411 Service for Text-Enabled Cell Phones", Nov. 4, 2004.

"USA Global Link Brings Interactively to Internet Shopping," Business Wire, Oct. 1998.

"Walker Digital Issued Landmark U.S. Patent No. 5,862,223 for Global Internet Marketplace for Experts". Business Wire, Jan. 26, 1999.

Welcome to the Electronic Emissary Project's WebCenter at www.tapr.org/emmisary/.

"Welcome to Jambo—The leader in Pay-per-Call Solutions" (search results) Oct. 17, 2005.

When Business Plan and Real World Clash, Wall Street Journal, Jun. 9, 1999, B1.

William H. Chimiak, et al, "Multimedia Collaborative Remote Consultation Tools Via Gigabit WAN In Teleradiology", IEEE 1994, Phoenix, p. 417 (7 pgs.).

USPTO, Transaction History for U.S. Appl. No. 10/021,877, filed Dec. 14, 2001, entitled "Apparatus and Method for Online Advice Customer Relationship Management."

USPTO, Transaction History for U.S. Appl. No. 10/032,518, filed Dec. 27, 2001, entitled "Apparatus and Method for Scheduling Live Advice Communication with a Selected Service Provider."

USPTO, Transaction History for U.S. Appl. No. 08/702,833, filed Aug. 23, 1996, entitled "Method for Establishing Anonymous Communication Links," now U.S. Patent No. 5,907,677.

USPTO, Transaction History for U.S. Patent Application Serial No. 10/460,776, filed Jun. 12, 2003, entitled "Systems and Methods for Arranging a Call," now U.S. Patent No. 7,359,498.

USPTO, Transaction History for U.S. Appl. No. 12/026,488, filed Feb. 5, 2008, entitled "Systems and Methods for Arranging a Call."

Sterling, Greg, "Ingenio's Ether—Pay Per Professional Advice," Search Engine Journal, Mar. 3, 2006.

* cited by examiner

GATE KEEPER

This application claims priority to related provisional patent application No. 60/497,273 titled "GATE KEEPER" filed Aug. 22, 2003, and is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of electronic information access. More particularly, an embodiment of the present invention provides a technique for granting access to establish a communication channel with a service provider.

BACKGROUND

Currently, consumers interested in acquiring services must first identify the service provider who is capable of providing the required services. This usually means perusing a telephone directory, which can become frustrating and time-consuming if the service providers telephoned are not immediately available. A phone book (whether a bound paper book or an electronic directory) is also not very effective if the service provider's business category is unknown.

The availability of some telephone book services over the Internet has somewhat lessened the time involved in finding a service provider. The present Internet-based systems, however, fail to address other issues such as facilitating the contact between the consumer and the service provider.

Moreover, a service provider may receive many requests from various consumers at the same time, which may be humanly impossible to respond to individually. For example, a qualified tax consultant may be inundated with tax questions on April 14th. The tax consultant may have previous obligations (e.g., legal or personal) to existing consumers, which would have to take precedence over new consumers.

Filtering through thousands of emails or phone calls is a cumbersome task, especially when there is limited time to respond. One solution would be to have different phone numbers and email addresses for different types of consumers. This presents obvious drawbacks associated at least with costs and the effort in sifting through the messages or calls.

Another solution would be to hire employees for a temporary situation (e.g., tax day rush). However, the temporary employees may not be trained sufficiently or unavailable at the particular time. Hiring employees may also involve numerous overhead items, for example, additional taxes, additional space, etc.

More generally though, the current state of the art allows anyone to call and at any time—telemarketers, ex-girlfriends, unwanted business partners. To deal with this problem, one can use human filters, such as secretaries or personal assistants, who "gate keep" for executives. One can also turn his or her phone off, but then the phone is off for everyone. For instance, one's spouse would not be able to call in an emergency.

Another problem is that people have to file many phone numbers for a single person depending on whether they might be at home, work, or on their cell phone. Moreover, caller ID services generally do not provide a solution because they do not always have the caller's name. Additionally, for each of the telephone addresses, people have to remember the digits of a phone number, which in actuality are the digits of machine language.

SUMMARY OF THE INVENTION

Novel systems and methods are disclosed to provide services more efficiently to various consumers based on the consumers' needs and/or available resources. In one embodiment of the present invention, a method of facilitating contact between a service provider and a consumer is disclosed. The method includes: the consumer selecting the service provider; the consumer requesting immediate contact with the service provider; determining whether the service provider permits immediate contact by the consumer; and if it is determined that the service provider permits immediate contact by the consumer, establishing immediate contact between the service provider and the consumer.

In an embodiment of the present invention, a method of gate keeping contact between a plurality of users is disclosed. The method includes: providing a central network to establish communication between the plurality of users; and each of the plurality of users having access to a facility to approve or disapprove of any of the plurality of users to permit communication between respective users.

In another embodiment of the present invention, the service provider is selected by performing a search of a directory of service providers.

In a further embodiment of the present invention, the search is performed by utilizing categories.

In a yet another embodiment of the present invention, the immediate contact is established by a method selected from a group comprising a telephone call, an instant messenger, and a videoconference.

In a different embodiment of the present invention, the determining act is performed by checking a consumer list of the service provider to determine whether the consumer is associated with a category, which may have immediate contact with the service provider.

In yet a different embodiment of the present invention, the consumer list includes consumer information organized by a category selected from a group comprising blocked, new consumer, and unassigned.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In addition, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
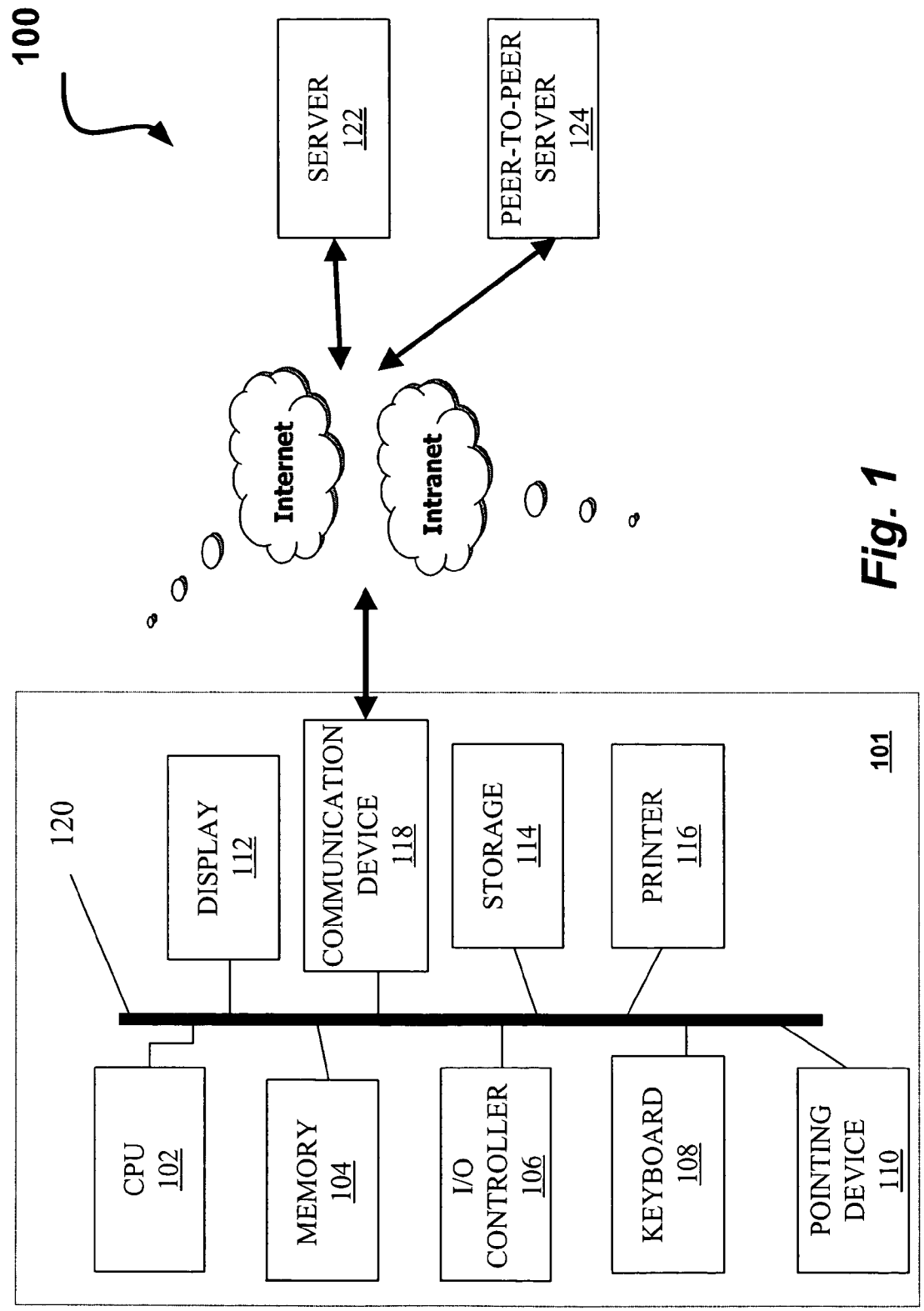
FIG. 1 is a simplified exemplary block diagram of a computer system in which the present invention may be embodied.

FIG. 1 illustrates an exemplary block diagram of a computer system 100 in accordance with an embodiment of the present invention. It is envisioned that the computer system 100 may be utilized to implement various embodiments of the present invention. The system 100 includes a computer 101, which in turn includes a central processing unit (CPU) 102, a main memory 104, an input/output controller 106, a keyboard 108, a pointing device 110 (e.g., mouse, track ball, pen device, or the like), a display device 112, and a mass storage 114 (e.g., hard disk, optical drive, or the like). Additional input/output devices, such as a printing device 116, may be included in the computer 101 as desired.

A communication device 118 may provide access to online services for example via the Internet or an intranet. The communication device 118 can be selected from a variety of devices such as an analog modem, a network card such as an Ethernet, Fast Ethernet, and Token Ring, a digital modem such as a digital subscriber line (DSL) and its varieties such as asynchronous DSL (ADSL), a wireless modem, and the like. The connection to the Internet and/or an intranet may provide access to a server 122 which can be any type of a server including a web server, file transfer protocol (FTP) server, Novell server, Microsoft Windows-based servers, and the like.

As shown in FIG. 1, access to a peer-to-peer server 124 may also be provided through the Internet and/or an intranet. As illustrated, the various components of the computer 101 may communicate through a system bus 120 or similar architecture. In an embodiment, the computer system 100 includes an IBM-compatible personal computer utilizing an Intel microprocessor, which is available from several vendors (including IBM of Armonk, N.Y.). Those with ordinary skill in the art understand that any type of computer system may be utilized to embody the present invention, including those made by Hewlett Packard of Palo Alto, Calif. Also, instead of a single processor, two or more processors can be utilized to provide speedup in operations.

Figure 2:
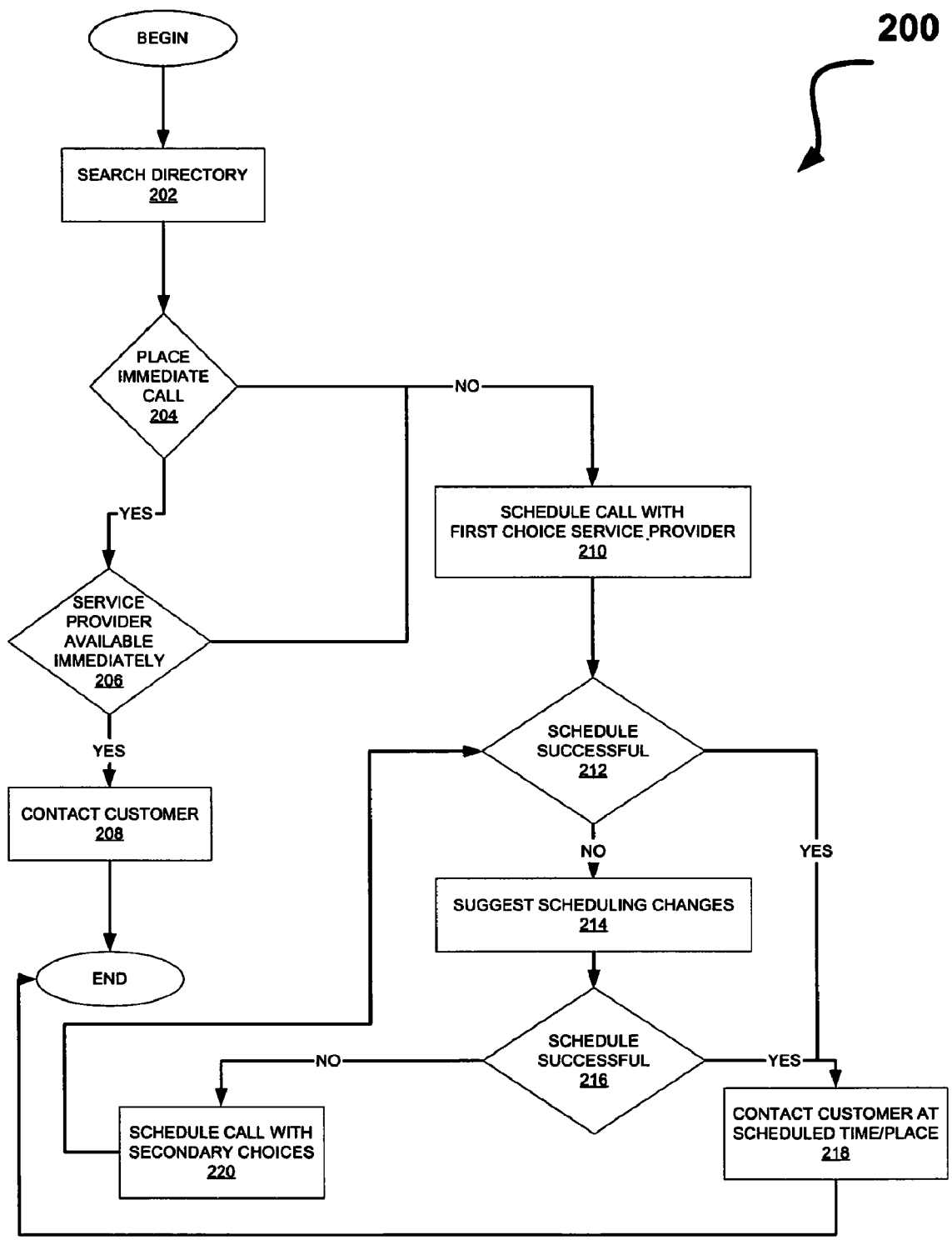
FIG. 2 illustrates an exemplary flow diagram of a service provider contact facilitation method 200 in accordance with an embodiment of the present invention.

FIG. 2 illustrates an exemplary flow diagram of a service provider contact facilitation method 200 in accordance with an embodiment of the present invention. The method 200 starts in a stage 202, which allows a consumer having access to a server (such as those discussed with reference to FIG. 1) to search a directory of service providers. In an embodiment of the present invention, the directory may include information regarding the service providers' experience, background, availability, preferences, and reviews (e.g., done by impartial third parties, previous consumers, entities specializing in verifying background information, and the like).

In one or more embodiments of the present invention, the following techniques may be utilized to search for a service provider:

to receive advice on a particular topic, a predefined category may be selected by a consumer (e.g., which may further identify topics, and subtopics);

a search engine may be utilized by typing in the word or words that best describe the subject for which the consumer wishes to receive advice; and/or a search may also be done for specific advisors by typing their name (e.g., member name, real name, expertise, and the like).

It is envisioned that the search may be performed using Boolean, case-sensitive, wildcard-based, and the like. Once a consumer selects a service provider, a stage 204 determines whether the consumer would like to place an immediate call to the service provider. If it is determined that an immediate contact is requested, a stage 206 determines whether the selected service provider is available immediately. If the service provider is available immediately, the consumer is contacted in a stage 208 and the method 200 terminates. In accordance with an embodiment of the present invention, the immediate contact is established by a telephone call, an instant messenger, a videoconference, or the like.

In one embodiment of the present invention, the contact (208) may be established by calling the consumer after the consumer elects a call now option. The call may be placed through a regular phone system, over the Internet, a cellular phone, and the like. If the consumer's phone is busy, the system (such as that discussed with reference to FIG. 1, including the servers 122 and 124) may retry for a select number of times. A failure may be followed up with form of notification to the consumer such as an email, a voice call, a voicemail, a page, and/or an instant message. If a consumer only has a single phone line, the consumer may be instructed to hang up to receive the call in accordance with an embodiment of the present invention. In another embodiment of the present invention, after the consumer receives the call, the consumer may be prompted to press a code (such as a digit or name) to acknowledge the consumer's intention to pay for the service provider's time.

In yet another embodiment of the present invention, a recorded advice may be offered to the consumer instead of a live one for example, for a recipe, specific information, recurring advise, and the like. Moreover, provision of a recorded advice is envisioned to be especially beneficial in situations where live advice is unavailable (for example due to the time of day or a quiet period identified by, for example, the service provider). In a different embodiment of the present invention, the consumer can replay a recorded advice without incurring additional charges.

In a further embodiment of the present invention, the availability of the service provider (206) is determined by contacting the service provider through voice call, voice mail, email, and the like. Once the availability of the service provider is successfully determined, a call (or other communication channel such as those discussed herein) may be established in accordance with the stage 208.

In accordance with another embodiment of the present invention, the service provider is envisioned to be in control of his/her contact (e.g., giving out home number, cell number, email address, etc.). The computer system may manage the specifics such as the phone numbers. In other words, the service provider may maintain his/her persona as a system entity instead of having to give out number, emails, etc. For example, if the service provider decides to drive somewhere, he/she may inform the system that his/her contact phone number should be his/her cell phone number for the next one hour and then the service provider will be unavailable or available at a different contact number, location, and so on. Such a solution is envisioned to also maintain certain sensitive information protected. For example, for personal matching services, a partner may not want to provide his/her home number to everybody who is interested in establishing contact with that person.

In one embodiment of the present invention, the consumer joins a service to obtain access to service providers. The information required to join may include any combination of the following: an email address, a password, a phone number, whether the same phone number is used for accessing the Internet (i.e., a single phone line), and/or various option such as interest in receiving future mailings or information, agreeing with terms and conditions of a contract, and the like.

In a further embodiment of the present invention, the consumer contact (the stage 208 of FIG. 2) is established by emailing the consumer, visiting the consumer in person at the consumer's location, the service provider meeting the consumer at a determined location, and the like.

Referring back to FIG. 2, if the stage 204 determines that the consumer has not requested an immediate call or the stage 206 determines that the service provider is unavailable immediately, the method 200 resumes in a stage 210, which schedules a call with the selected service provider. In a stage 212, it is determined whether the scheduling of the stage 210 has been successful. If the scheduling has been successful, a stage 218 facilitates the contact with the consumer and the method 200 terminates. Otherwise, a stage 214 suggests scheduling changes.

After the stage 214, a stage 216 determines whether the scheduling was successful. If the stage 214 is successful, the method 200 resumes with the stage 218. Otherwise, a stage 220 suggests scheduling contact with a different service provider. In an embodiment of the present invention, the secondary choice of a different service provider may be made by the consumer during the original search (stage 202). Alternatively, the consumer may be directed (at stage 220) to select a secondary choice. After the stage 220, the method 200 returns to the stage 212.

Figure 3:
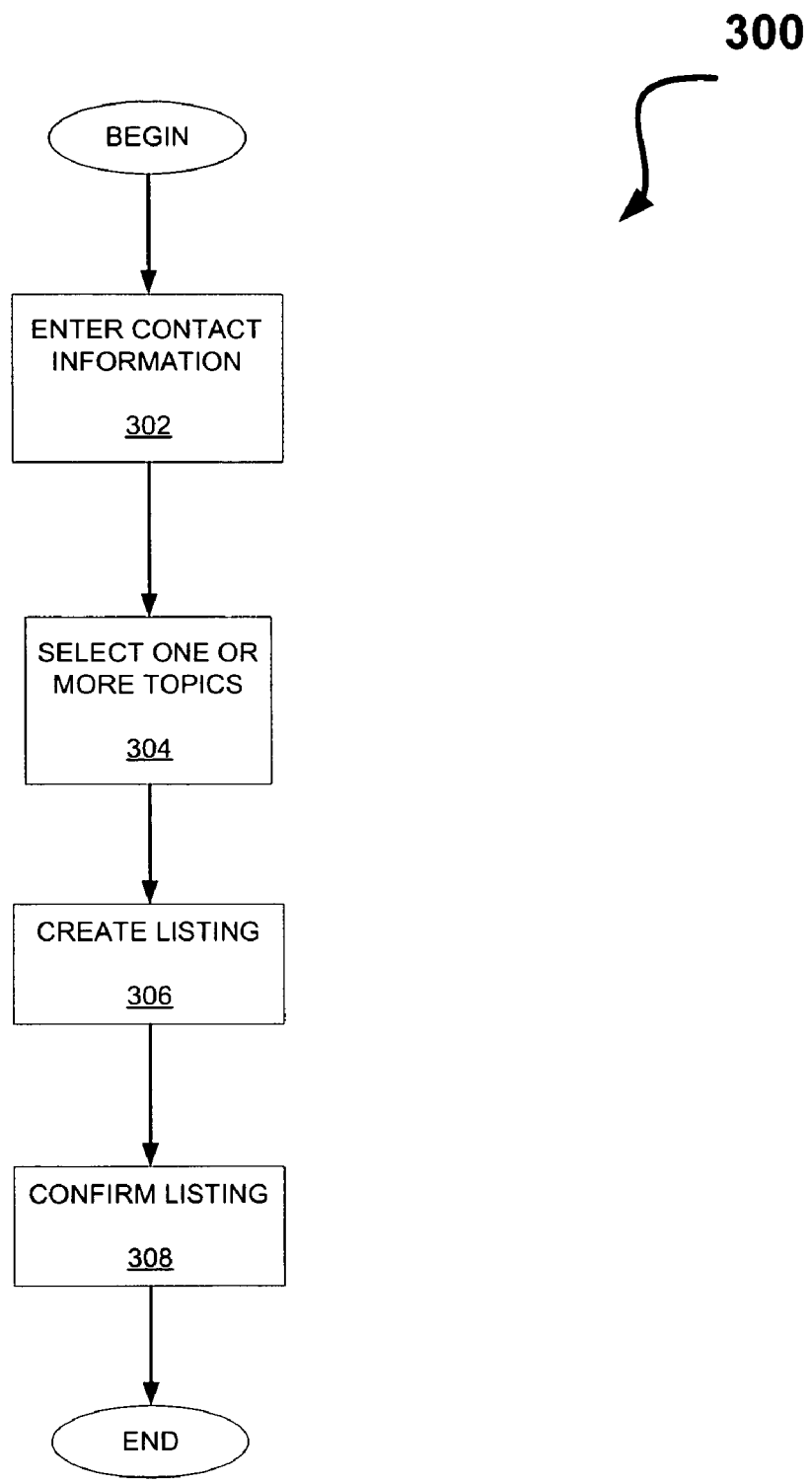
FIG. 3 illustrates an exemplary flow diagram of a service provider listing provision method 300 in accordance with an embodiment of the present invention.

FIG. 3 illustrates an exemplary flow diagram of a service provider listing provision method 300 in accordance with an embodiment of the present invention. The method 300 starts in a stage 302 wherein a service provider enters his/her contact information regarding the service providers preferred method of contact. For example, the service provider may provide his/her telephone number, email address, wireless telephone number, pager number, and other information such as whether the service provider utilizes the same phone number to access the Internet. In a stage 304, the service provider selects the topics for which the service provider is willing to provide his/her services. In the stage 304, the service provider may select one or more topics from a list of topics such as accounting, business, career and education, computing and Internet, counseling and health, dieting and fitness, legal, life-coaching, other, personal finance, psychics and astrology, social or entertainment, and/or taxes. It is envisioned that in accordance with various embodiments of the present invention each of the topics may also include subtopics, which the service provider may select in the stage 304. For example, under a legal category, two subtopics may be provided such as business and/or personal.

The method 300 then continues in a stage 306, which creates a listing for the service provider. In the stage 306, the service provider may be asked to provide additional information such as title, nickname, expertise, services, a sales pitch, price of advice from the service provider (such as a dollar amount per minute), and/or additional information such as copies of professional degrees, certificates, a logo, and/or pictures. After finishing the stage 306, the service provider may be asked to confirm the created listing of the stage 306 in a stage 308. The method 300 then terminates once the stage 308 is completed by the service provider.

Figure 4:
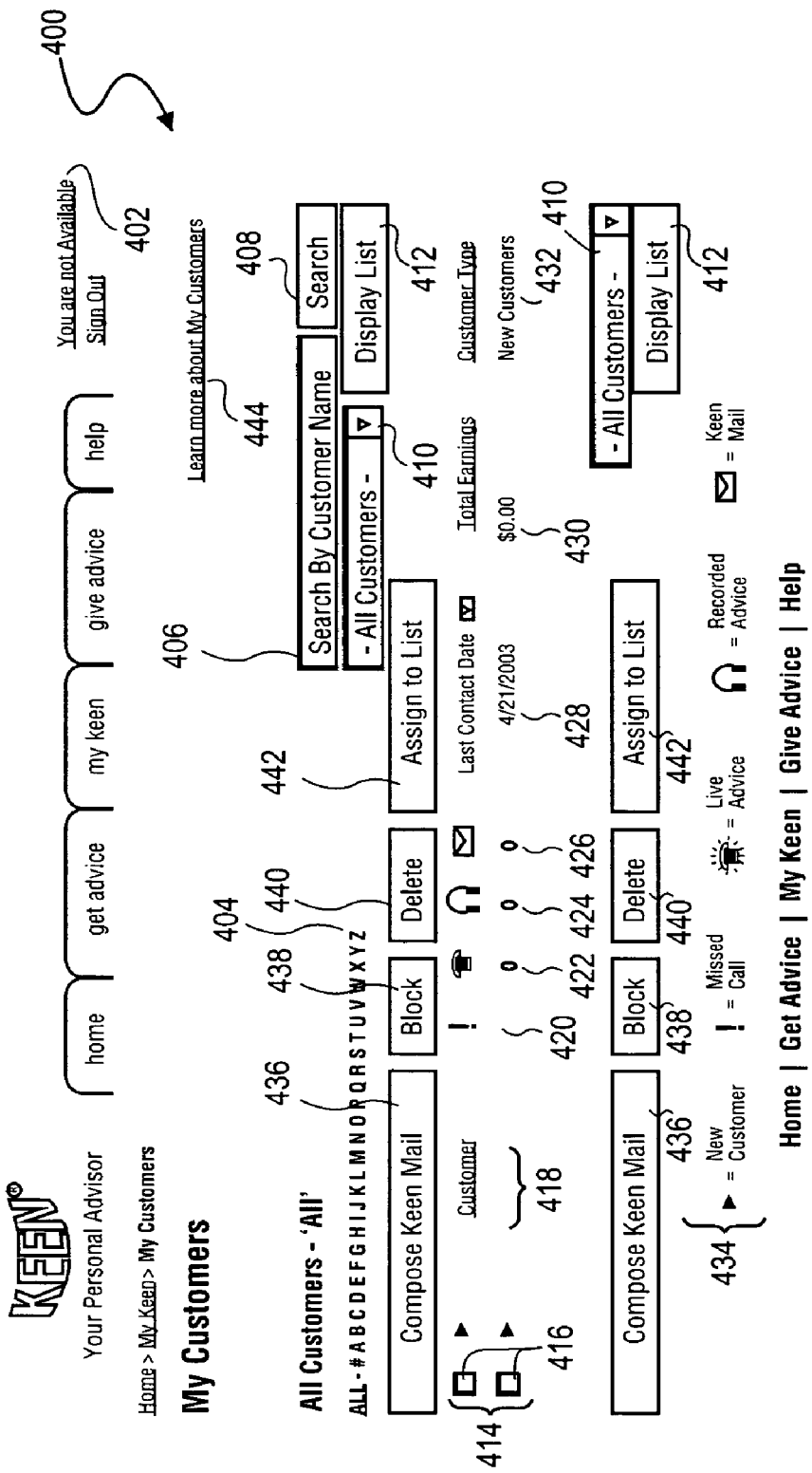
FIG. 4 illustrates an exemplary graphical user interface (GUI) 400 in accordance with an embodiment of the present invention.
Figure 5:
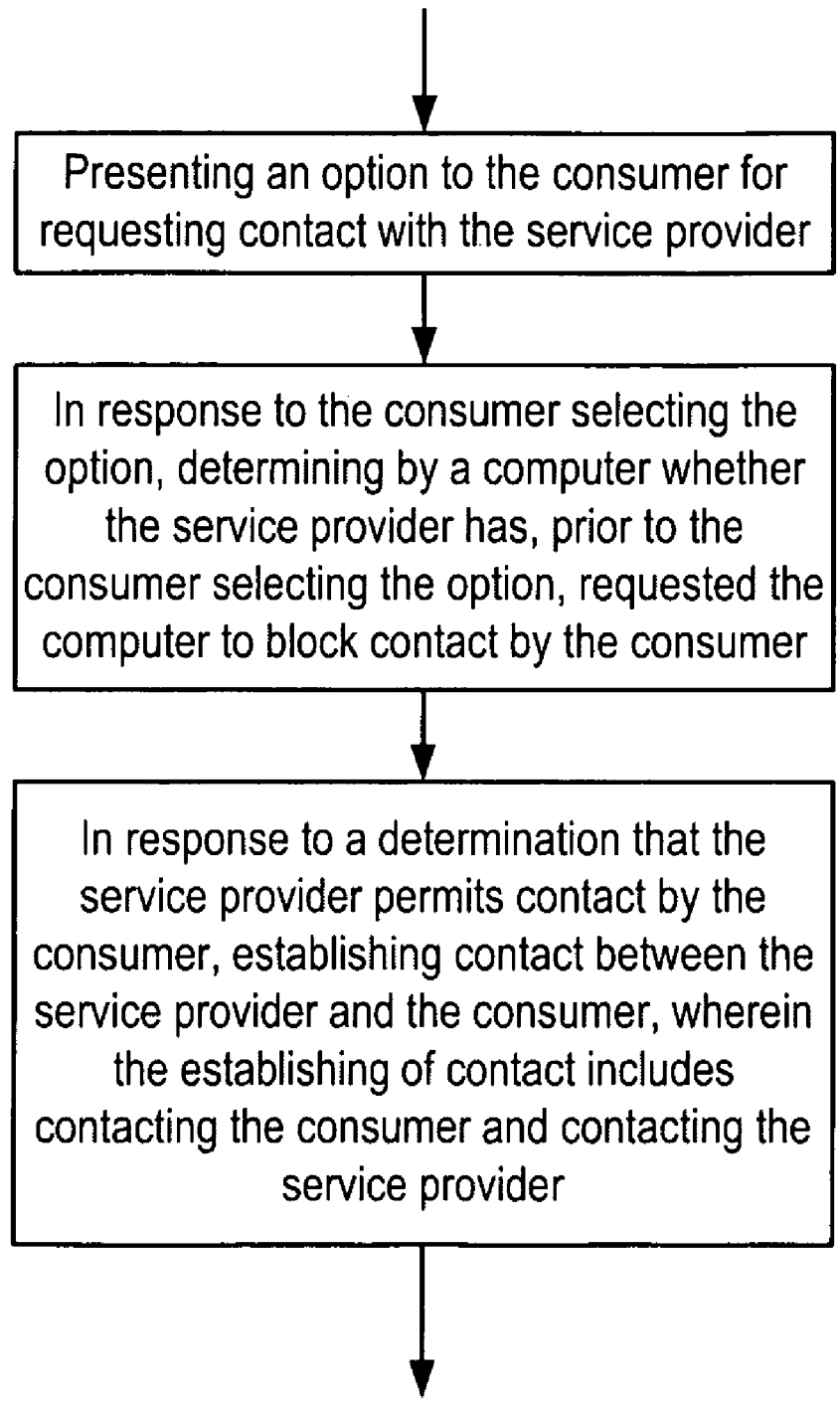
Fig. 5 illustrates a process according to one embodiment.

FIG. 4 illustrates an exemplary graphical user interface (GUI) 400 in accordance with an embodiment of the present invention. The GUI 400, in one embodiment, illustrates a web page that provides a service provider with detailed and sortable information about the service provider's consumers on a website such as www.keen.com (the assignee of the present application). The GUI 400 includes an availability field 402, which indicates whether the service provider viewing the GUI 400 is available to provide advice to consumers presently. The GUI 400 includes an additional set of selectable icons 404, which allows the service provider to either view all the service provider's consumers or their alphabetical listings.

The GUI 400 is also envisioned to enable the service provider to enter a search criterion for a consumer name in a field 406 (e.g., followed by pressing on a search button 408). The service provider may also select a category associated with consumers through a field (e.g., pull-down fields) 410 (e.g., followed by selecting a button 412 to display the category of consumers). In an embodiment of the present invention, the categories associated with each consumer may be selected from a group including blocked, new, unassigned, and other categories that may be created by a service provider.

In one embodiment of the present invention, the service provider can define categories with gradients such as hold all calls except mother, boss, and the like. Also, a consumer may be assigned to multiple categories. For example, an emergency privilege may be created for a select group of people such as family, immediate family, children, spouse, partner, boss, coworker.

In a further embodiment of the present invention, it is envisioned that the techniques of the present invention may be applied to managing all contacts whether personal or business related. For example, certain categories may be created in accordance with scheduling considerations such as only the immediate family may contact the service provider during times determined as quiet or nap times.

The GUI 400 includes a consumer list area 414, which allows the service provider to select one or more consumers by selecting buttons 416 associated with each consumer. The consumer area 414 may also include a consumer name field 418 and one or more indicators to show whether the consumer is on the service provider's blocked list, the number of missed calls (420), the number of live contacts the consumer has had with the service provider (422), the number of recorded advices the consumer has listened to (424), the number of e-mails the service provider has sent to the consumer (426), last contact date (428), total earnings from the consumer (430), consumer type (432) (e.g., such as discussed with reference to filed 410), or the like.

The GUI 400 may also include a ledger area 434 indicating what each of the icons in the consumer area 414 means. In an embodiment of the present invention, the consumer information area 414 is presented as a table that has sortable columns (except the check box column 416). Accordingly, the consumer information may be sorted based on various fields presented in the GUI 400 (e.g., in descending or ascending order).

In accordance with another embodiment of the present invention, the GUI 400 allows a service provider to select various consumers and perform certain functions by selecting or clicking on buttons such as compose mail 436, block 438 (e.g., which blocks the user from contacting the service provider directly by associating that consumer with a blocked list as discussed with respect to the field 410), delete 440, and/or assign to list 442 (e.g., by selecting a consumer type from field 410).

In a further embodiment of the present invention after selecting a consumer through the buttons 416 and clicking on the assign to list button 442, the service provider is presented with a separate page which will let the service provider assign the selected consumer(s) to a given consumer list. The GUI 400 also includes a button 444, which allows the service provider to obtain further information about the service provider's consumers. For example, if the consumer has a photo on his or her photo page, it will appear at the top of the page beside the consumer's name or clicking on the consumer's name may send the service provider to the consumer's member page.

In accordance with one embodiment of the present invention, a service provider may categorize his or her consumers (e.g., by utilizing the GUI 400 of FIG. 4) and allow the consumers to contact the service provider through different methods. For example, a service provider may indicate whether a given consumer may perform the stage 204 of FIG. 2 (i.e. place an immediate call to the service provider). Alternatively, the service provider may (e.g., depending on the consumer's category) permit the consumer to access the service provider's calendar (such as that discussed with reference to stage 210 of FIG. 2).

It is envisioned that in various embodiments of the present invention the consumer's categories may be provided through personal data management (PDA) applications such as an address book, or otherwise through databases which the service provider selects for providing such information to the GUI 400. For example, a service provider may prioritize his/her consumers based on previous contacts with the consumer, and based on the consumer's category allow the consumer to edit the service provider's calendar (i.e., have read and write access to the service provider's calendar), call the service provider immediately, not allow the consumer to contact the service provider via email, not allow the consumer to contact the service provider via phone and the like.

In one embodiment of the present invention, a central network is provided that empowers each individual to gate keep and/or better communicate with others on the network. Each person can approve or disapprove of each other person, thereby only permitting a certain person(s) to ring their respective phone, for example, at certain times.

For instance, when taking a nap, one could inform the system (e.g., through placing a call to an automated system and/or selecting options on a web page, cell phone, etc.) to hold all calls unless it is from spouse or children. Alternatively, one may issue instructions to hold all calls unless it is from spouse or children and they have indicated to the system that the call is regarding an "emergency." In this case the phone would be rung, for example.

In accordance with various embodiments of the present invention, no unwanted telemarketers could get through or, for example, after breaking up with a boyfriend or girlfriend, they could be blocked. In a further embodiment of the present invention, one can schedule calls to happen at certain times only. The applied filters may include one or more items such as time period, even type, condition, categories, and the like. In yet another embodiment of the present invention, the requirement to remember any machine-language telephone numbers is circumvented.

For example, one would just see the entity "Bob Smith" trying to get in touch. Bob Smith may organize the routing and gate keeping on his end. Also, a buddy list could organize the gate keeping. And, a back-and-forth communications handshake may get one on to the buddy list such as discussed with various embodiment of the present invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

For example, the techniques discussed with reference to various embodiments herein may be applied to any matching process such as matching singles, business or personal partners, buyers and sellers, and the like. Therefore, references to details of various embodiments are not intended to limit the scope of the claims which in themselves recite only those features regarded as essential to the invention.

What is claimed is:

1. A computer-implemented method to facilitate contact between a service provider and a consumer, the method comprising:

presenting a user interface including a list of categories for the consumer to the service provider, wherein the list of categories for the consumer includes blocked, new and unassigned;

receiving input from the service provider assigning the consumer to a category from the list of categories;

presenting an option to the consumer for requesting telephonic contact with the service provider;

in response to the consumer selecting the option, determining by a computer whether the service provider has, prior to the consumer selecting the option, requested the computer to block telephonic contact by the consumer by assigning the category to the consumer using the user interface; and in response to a determination that the service provider permits telephonic contact by the consumer, establishing telephonic contact between the service provider and the consumer, wherein the establishing of telephonic contact includes contacting the consumer and contacting the service provider.

2. The method of claim 1, further comprising: performing a search of a directory of service providers to select the service provider.

3. The method of claim 2 wherein the search is performed by utilizing categories.

4. The method of claim 1 wherein the contacting the service provider comprises the computer initiating a telephone call to the service provider.

5. The method of claim 1 wherein the contact is facilitated for personal reasons.

6. The method of claim 1 wherein the contact is established by one of: an instant messenger, and a videoconference.

7. The method of claim 1, further comprising:
providing the service provider with a user interface to create a listing of the service provider and to receive contact information from the service provider;
providing a user interface to the service provider to allow the service provider to select a category from a plurality of categories and assign the consumer to the selected category, wherein the determining of whether the service provider has requested to block contact by the consumer is based on the category; and
providing a search interface to the consumer to allow the consumer to locate the listing of the service provider and to present the option for requesting contact with the service provider.

8. A computer-implemented method to facilitate contact between a service provider and a consumer, the method comprising:
receiving from the service provider:
contact information of the service provider, including a telephone number; and
a listing describing a service of the service provider;
presenting a user interface including a plurality of categories for the consumer to the service provider, wherein the plurality of categories for the consumer includes a category of blocked, a category of new and a category of unassigned;
receiving input from the service provider to select at least one consumer from the user interface and assign the selected consumer to one of the plurality of categories;
presenting to the consumer the listing describing the service of the service provider;
upon the consumer requesting telephonic contact with the service provider, determining by a computer whether the service provider has, prior to the consumer requesting telephonic contact with the service provider, requested to block telephonic contact by the consumer by assigning the consumer with the category of blocked;
in response to a determination that the service provider permits telephonic contact by the consumer, establishing telephonic contact between the service provider and the consumer, wherein the establishing of telephonic contact includes contacting the consumer and contacting the service provider using the contact information of the service provider; and
in response to a determination that the service provider does not permit contact by the consumer based on the category of blocked, blocking the consumer from telephonic contact with the service provider.

9. The method of claim 8 further including receiving from the service provider at least one topic corresponding to an advice the service provider intends to provide to a plurality of consumers.

10. The method of claim 9, further comprising: presenting a user interface to allow the service provider to specify the topic by selecting the topic from a plurality of predetermined topics.

11. The method of claim 10 wherein the plurality of predetermined topics includes at least one of accounting, business, career, education, computing, Internet, counseling, health, dieting, fitness, legal, life-coaching, other, personal finance, psychics, astrology, social, entertainment, and taxes.

12. The method of claim 10 wherein each of the plurality of topics includes at least one subtopic.

13. The method of claim 12 wherein the subtopic is one of: personal and business.

14. The method of claim 8 further including receiving a confirmation from the service provider for creating the listing.

15. The method of claim 8, further comprising: performing a search of a directory of service providers to identify the listing for presenting to the consumer.

16. The method of claim 8 wherein the contact is facilitated for personal reasons.

17. A system comprising:
a processor; and
memory coupled to the processor, the memory storing instructions to cause the processor to:
present a user interface including a list of categories for a consumer to a service provider, wherein the list of categories for the consumer includes blocked, new and unassigned;
receive input from the service provider assigning the consumer to a category from the list of categories;
present an option via a server to the consumer for requesting email contact with the service provider;
determine whether the service provider has, prior to the consumer selecting the option, requested to block email contact by the consumer; and
provide email contact between the service provider and the consumer via contacting the consumer and contacting the service provider, in response to a determination that the service provider permits email contact by the consumer.

18. The system of claim 17 wherein the server performs a search of a directory of service providers to identify the service provider in response to a search request.

19. The system of claim 18 wherein the search is performed by utilizing categories.

20. The system of claim 17 wherein the server checks a consumer list of the service provider to determine whether the consumer is associated with a category that allows contact with the service provider.

21. An article of manufacture to facilitate contact between a service provider and a consumer, the article comprising:
a non-transitory machine readable storage medium that provides instructions that, if executed by a machine, will cause the machine to perform operations including:
presenting a user interface including a list of categories for the consumer to the service provider, wherein the list of categories for the consumer includes blocked, new and unassigned;
receiving input from the service provider assigning the consumer to a category from the list of categories;
presenting an option to the consumer for requesting telephonic contact with the service provider;

in response to the consumer selecting the option, determining whether the service provider has, prior to the consumer selecting the option, requested to block telephonic contact by the consumer; and in response to a determination that the service provider permits telephonic contact by the consumer, establishing telephonic contact between the service provider and the consumer, wherein the establishing of telephonic contact includes contacting the consumer and contacting the service provider.

22. The article of claim 21 wherein the operations further include performing a search of a directory of service providers to identify the service provider.

23. The article of claim 21 wherein the contact is established via one of: a telephone call, an instant messenger, and a videoconference.

24. The article of claim 21 wherein the determining of whether the service provider has requested to block contact by the consumer includes checking a consumer list of the service provider to determine whether the consumer is associated with a category that allows contact with the service provider.

* * * * *